(12) United States Patent
He

(10) Patent No.: US 6,212,701 B1
(45) Date of Patent: Apr. 10, 2001

(54) COMPLETELY AUTOMATIC WATERLESS CLOSET

(76) Inventor: Englong He, No. 10 Dongli, Anwai Xiao Guan, Chaoyang District, Beijing 100029 P.R. (CN)

( * ) Notice: Subject to any disclaimer, the term of this patent is extended or adjusted under 35 U.S.C. 154(b) by 0 days.

(21) Appl. No.: 09/171,620

(22) PCT Filed: Apr. 24, 1996

(86) PCT No.: PCT/CN96/00027
§ 371 Date: May 18, 1999
§ 102(e) Date: May 18, 1999

(87) PCT Pub. No.: WO97/39673
PCT Pub. Date: Oct. 30, 1997

(51) Int. Cl.[7] .................................................. A47K 11/02
(52) U.S. Cl. ............................................................. 4/449
(58) Field of Search ........................................ 4/449, 484

(56) References Cited

U.S. PATENT DOCUMENTS

| | | | |
|---|---|---|---|
| 3,452,368 | * 7/1969 | Couper | 4/484 |
| 3,619,822 | * 11/1971 | Carmichael | 4/484 |
| 3,665,522 | * 5/1972 | Backlund et al. | 4/484 |
| 3,693,193 | * 9/1972 | May | 4/484 |
| 3,878,572 | * 4/1975 | Eriksson | 4/484 |

* cited by examiner

*Primary Examiner*—Charles E. Phillips
(74) *Attorney, Agent, or Firm*—Malcolm B. Wittenberg (57) ABSTRACT

The present invention relates to a fully automatic toilet ware without flushing, including a case body; a shaped cavity; a seat ring provided on said cavity; a plastic cover over the periphery of said case body; an opened-closed pulling mechanism to pull plastic bag, provided in said case body for controlling the connection between said shaped cavity and an excrement-holding box fixed under said case body; said case body is fixed on one pedal, and said pedal has one end hinged with base, said front end of said pedal is a swing end, and there is a pressing spring fixed between its end and the base, the pedal is hinged at least with one crank for controlling the operation of said opened-closed pulling mechanism, said crank has one end rolling against the supporting board of said base, and the other end is connected with said opened-closed pulling mechanism.

6 Claims, 10 Drawing Sheets

FIG. 16

# COMPLETELY AUTOMATIC WATERLESS CLOSET

TECHNICAL FIELD

The present invention relates to toilet equipment, in particular, to toilet equipment that is dry and sealed.

BACKGROUND TECHNOLOGY

To promote environmental protection people are becoming more and more aware of the defects of flush toilets. Therefore there have been various inventions, such as PCT/CN96/00009, which discloses a toilet seat stool which does not require flushing. Though said invention has features for preventing cross-contamination and for providing convenience and sanitation, its transmission is electrically controlled, which may lead to easy mal-operation when its user is not familiar with its structure. It also cannot be used in areas without electricity and water, such as at sea beaches.

SUMMARY

The objective of the present invention is to provide a dry and sealed toilet which operation is controlled by the weight of the human body. The present invention can be described as a fully automatic toilet usable without flushing, including a case body, a shaped cavity, a seat ring provided on said cavity, a plastic cover over the periphery of said case body, an open-close pulling mechanism to pull a plastic bag, provided in said case body for controlling the connection between said shaped cavity and an excrement-holding box fixed under said case body. The case body is fixed on one pedal, and the pedal has one end hinged with the base. The front end of said pedal is a swing end, and there is a pressing spring fixed between its end and the base. The pedal is hinged at least with one crank for controlling the operation of said open-close pulling mechanism, said crank has one end rolling against the supporting board of said base, and the other end is connected with said open-close pulling mechanism.

Another embodiment of the invention can be described as a fully automatic toilet usable without flushing, including a case body, a shaped cavity, a seat ring provided on said cavity, a plastic cover over the periphery of said case body, an open-close pulling mechanism to pull a plastic bag, provided in said case body for controlling the connection between said shaped cavity and an excrement-holding box fixed under said case body. At least one vertically movable controlling rod is provided on the periphery of said plastic cover, said seat ring having one end hinged with said shaped cavity, the controlling rod having its upper end against said ring via a spring fixed thereon. At least one gear is rotatably fixed at the lower part of said controlling rod, said gear being joggled with one fixed rack and one sliding rack, said open-close pulling mechanism being connected with said sliding rack.

The present invention fully utilizes the weight of the human body of the user to automatically control the operation of the open-close pulling mechanism. The toilet is reliable and has good adaptability and may be widely used in such cases as for general family usage, in tourist areas, in long-distance buses, trains, boats and aircraft.

SUMMARY OF DRAWINGS

The other objectives, structure and advantages of the present invention may be better understood with the detailed description by reference to the following drawings.

BEST MODE OF EMBODIMENT OF THE PRESENT INVENTION

Figure 1:
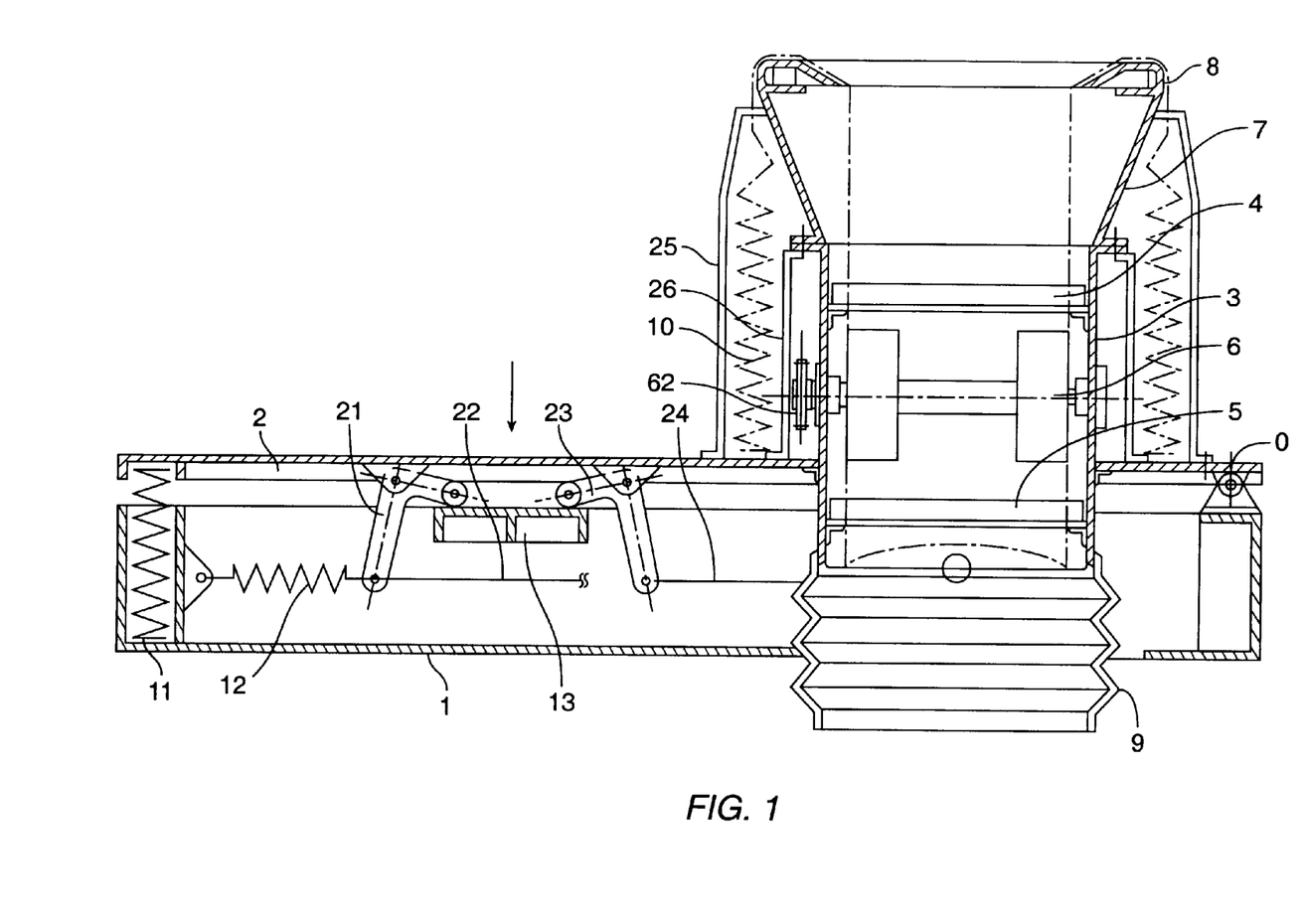
FIG. 1 is a longitudinal section view of one embodiment of the present invention.

Referring to FIG. 1, the toilet of the present invention includes a case body 3, a shaped cavity 7 formed on said case body 3, a seat ring 8 provided under said shaped cavity, a cover or plastic bag 10 provided over the periphery of said case body, wherein said cover is formed by an outer protective board 25 and inner protective cover 26 and plastic bag provided between the two protective boards. The plastic bag 10 is preferably composed of dissoluble plastics. The case body 3 is mounted on a pedal 2 which has its rear end hinged with base 1 and may swing around a supporting point 0. Between said base and the front end of pedal 2 is provided a press spring 11. The pedal 2 is hinged with two cranks 21,23 which control the operation of the open-close pulling mechanism provided in said case body 3. Each of said cranks has one end rolled on a supporting board 13 of said base 1, and the other end connects respectively to said open-close pulling mechanism via pulling ropes 22 and 24.

The moving directions of cranks 21 and 23 are opposite and a reset spring 12 is provided between the swing end of said crank 21 and the base.

The lower end of the case body 3 connects a excrement holding case (not shown) via a flexible tube 9.

Referring to FIGS. 2–5, the open-close pulling mechanism of the present invention includes a sealing means and a pulling means. The sealing means has a pair of upper sealing doors 41 mounted on an upper partition board 31 and a pair of lower sealing doors 51 mounted on a[n] lower partition board 32. The sealing doors have respectively spring 42 and 52 which may force them to close. The upper and lower doors are to be alternatively closed and said two upper sealing doors 41 connect to two pulling ropes 24 via pulleys 25,26 and 27 while said two lower sealing doors 51 connect to the upper sealing doors 41 via a pair of pulling ropes 44 and pulleys 43 and 53. Rope 24 connects with said crank 23 and the force of said spring 42 is bigger than that of said spring 52. The pulling means is provided between said upper and lower doors 41 and 51, and has a pulling wheel 63 mounted on a transmission shaft 60. The use of more than one pulling wheel 63 would be preferable. In addition, there is also provided a tension wheel 64 cooperating with said pulling wheels 63. Tension wheel 64 adjusts the press are between itself and pulling wheel 63 via adjusting screw 66 and support 65. On said transmission shaft there is provided a chain wheel 62 which is turned by a chain connected on said rope 22 and the other end of said chain connects to chain said case body 3 via an extension spring 67. The force of said reset spring 12 is stronger than that of said extension spring 67.

Crank 21 connects to said pulling rope 22 which controls the sealing means, while said crank 23 connects to said pulling rope 24 which controls said pulling means.

Between said chain wheel 62 and pulling wheel 63, there is provided a surpassing clutch which is provided in conjunction with said pulling wheel 63 or said chain wheel 62. The simplest chain wheel 62 is an ordinary flywheel of the type widely used on bicycles.

Figure 2:
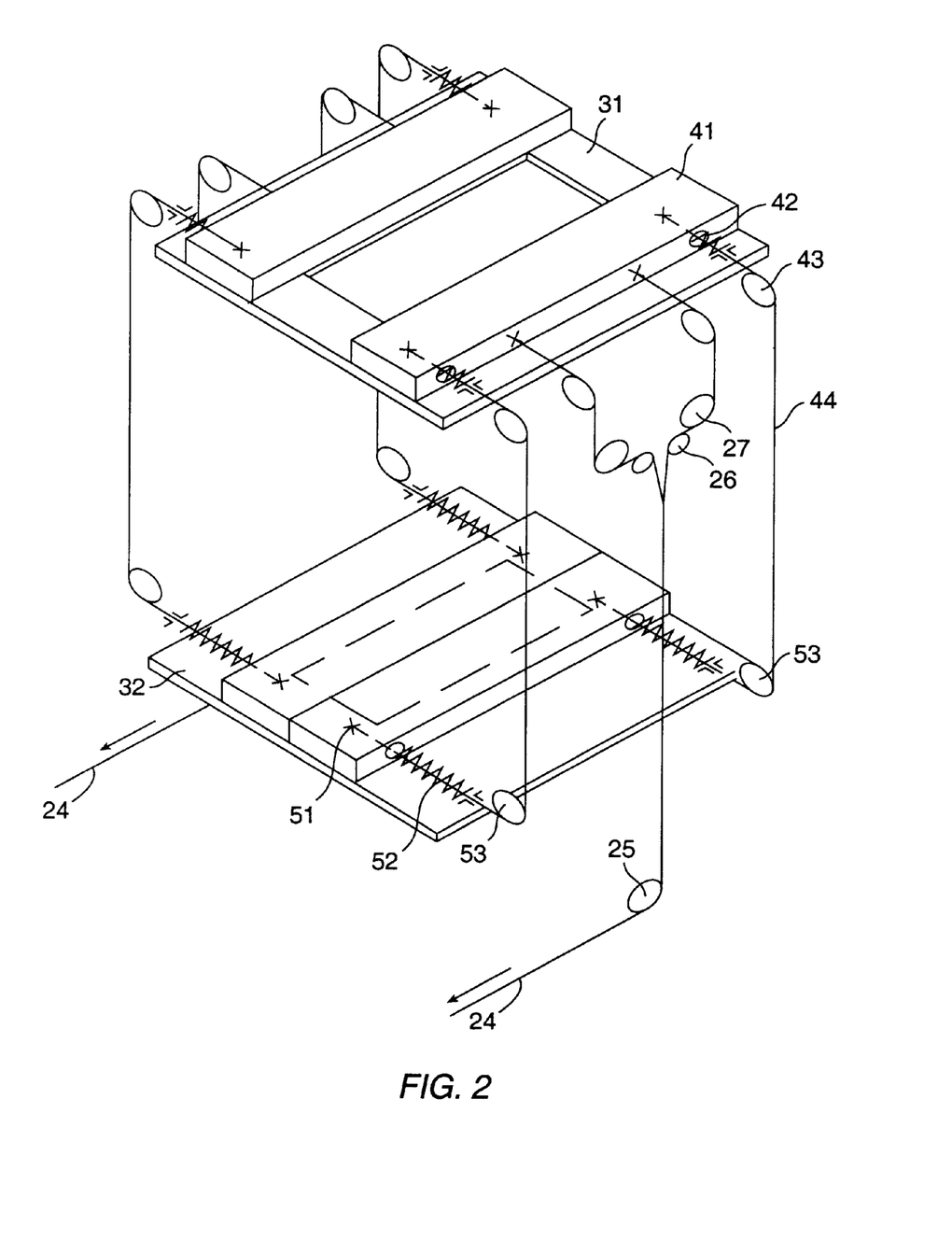
FIG. 2 is a perspective view of one embodiment of the seal structure of FIG. 1.
Figure 3:
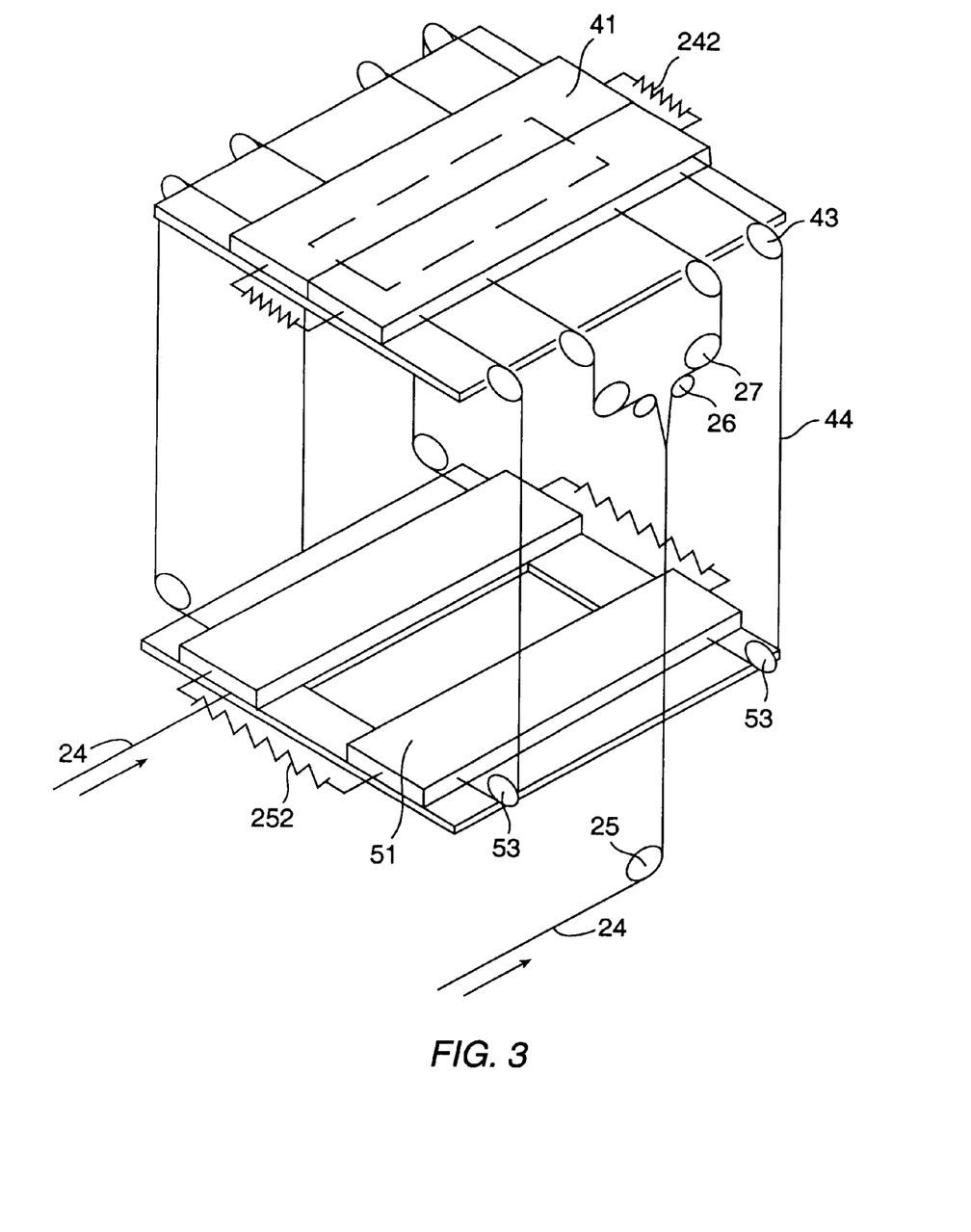
FIG. 3 is a perspective view of another embodiment of the seal structure of FIG. 1.
Figure 4:
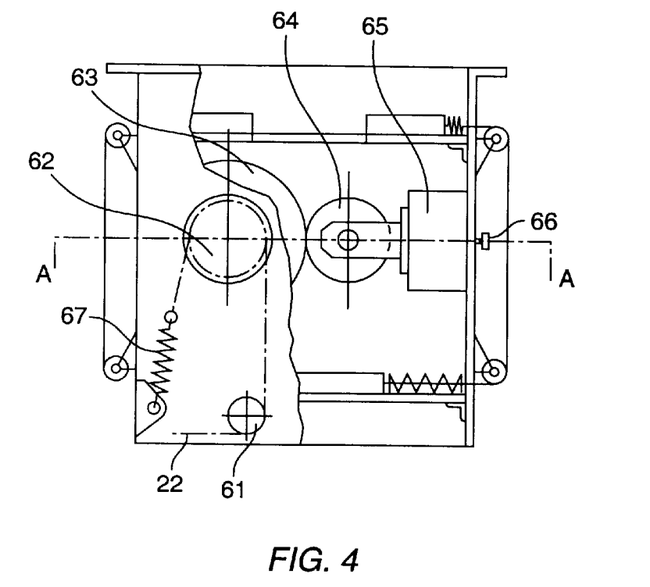
FIG. 4 is a side view of said pulling mechanism of FIG. 1.
Figure 5:
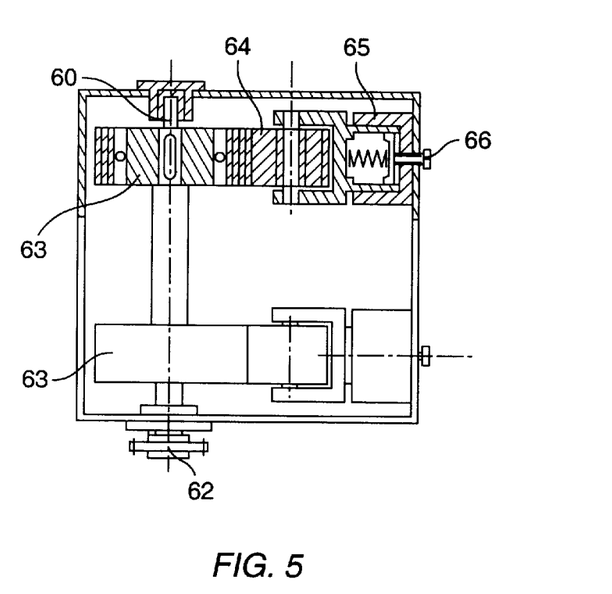
FIG. 5 is a half-sectional view along the line of A—A of FIG. 4.

FIG. 3 shows another embodiment of said seal structure. It differs from that of FIG. 2 in that said press springs 42 and 52 are replaced by extension springs 242 and 252. FIG. 2 shows the upper door being open and the lower door closed while FIG. 3 shows the upper door closed and the lower door open.

FIGS. 6–10 show another embodiment of the pulling open-close structure.

Open-close pulling mechanism mounted in case body 3 includes two symmetrically-arranged rollers 70, each of which has two pulling wheels 71 which connect to one another via a plywood board 72 positioned along the axis of said rollers. The maximum width of said plywood board 72 is equal to the diameter of the rollers 70 and the thickness of said board 72 is less than half of radius of said rollers. The two rollers 70 turn in opposite directions driven by said chain wheel 62 via transmission means 68 and 69. Two rollers 70 have a pressing means on one of them, such as screw 66 and support 65.

When open-close pulling mechanism as shown by FIGS. 6–10 is adopted, only one crank 21 may be provided, of which its swing end drives said chain wheel 62 to rotate via said rope 22 and chains connected with said rope. The other end of the chain connects to said case body via said extension 67. The force of said reset spring 12 connected between said swing end of said crank 21 and base 1 is stronger than that of spring 67. Said chain wheel 62 may be above the flywheel.

Figure 6:
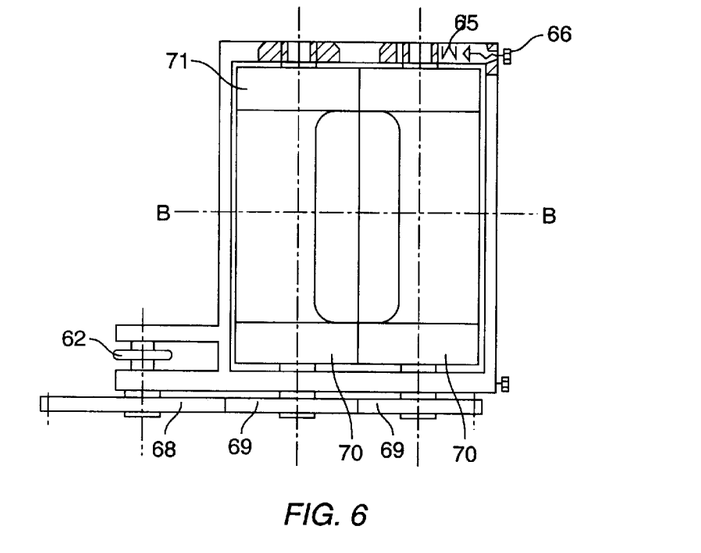
FIG. 6 is a top view with partial sectional view at the closing time of another embodiment of the open-close pulling mechanism of the present invention.
Figure 7:
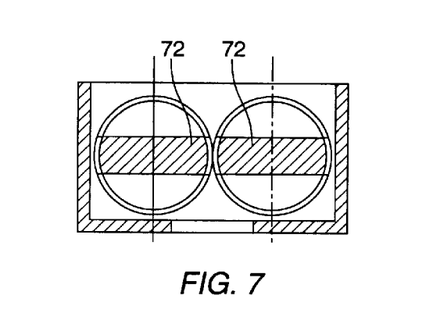
FIG. 7 is a view cut along B—B line of FIG. 6.
Figure 8:
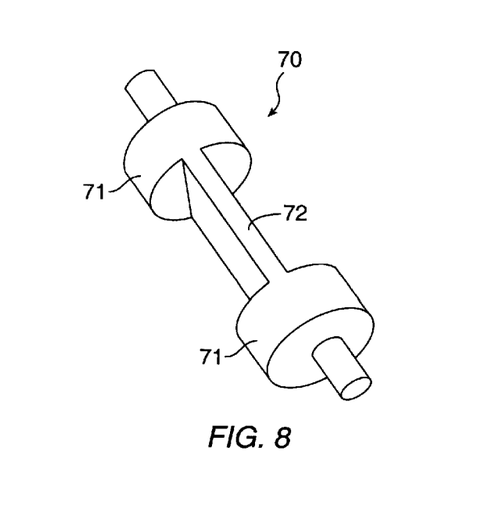
FIG. 8 is a perspective view of the pulling roller in FIG. 6 and 7.
Figure 9:
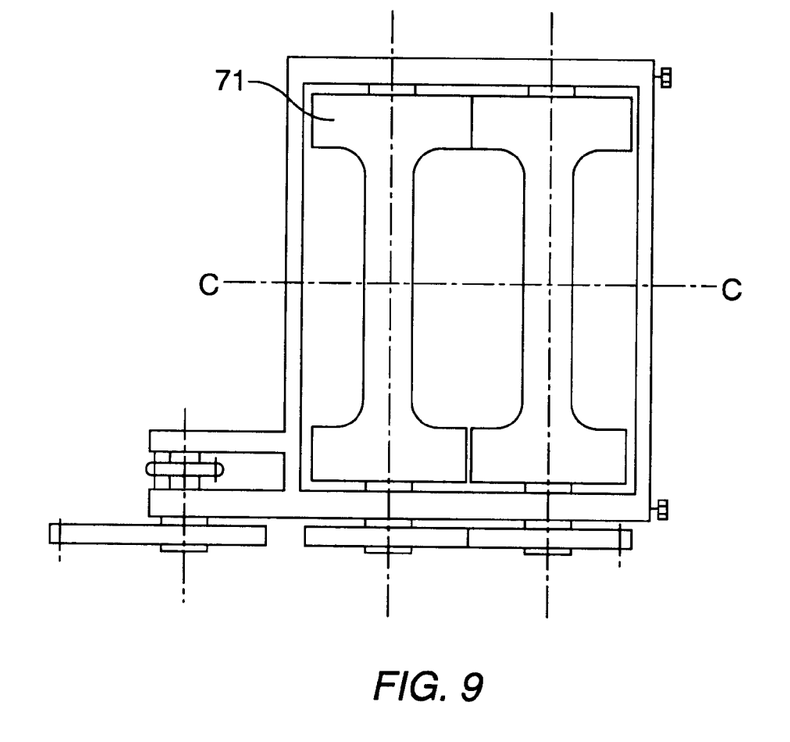
FIG. 9 is a top view of the pulling roller at the state of opening as shown in FIGS. From 6–8.
Figure 10:
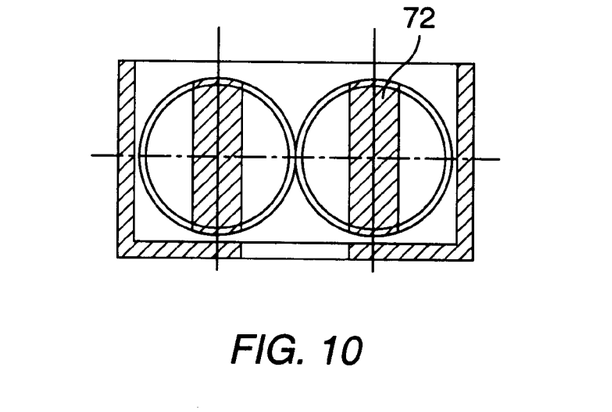
FIG. 10 is a view cut along C—C line of FIG. 9.
Figure 11:
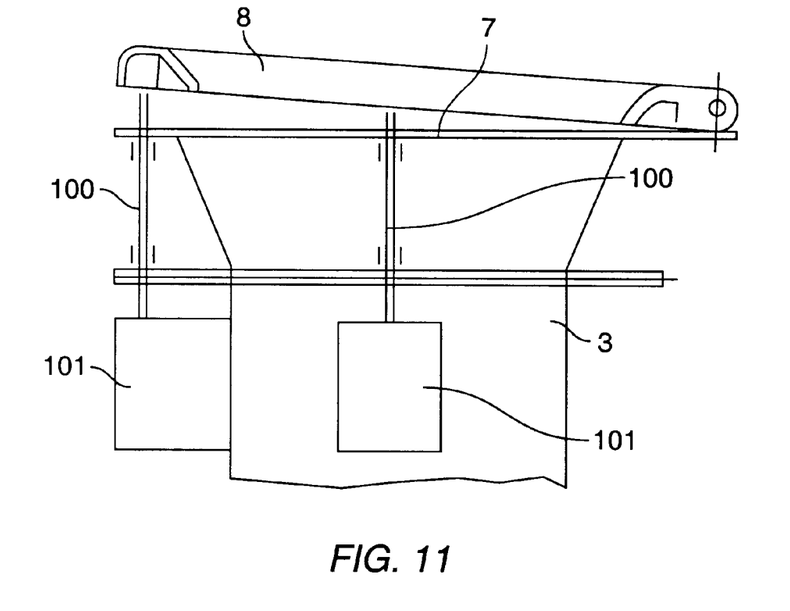
FIG. 11 is a perspective view of another embodiment of the present invention.
Figure 12:
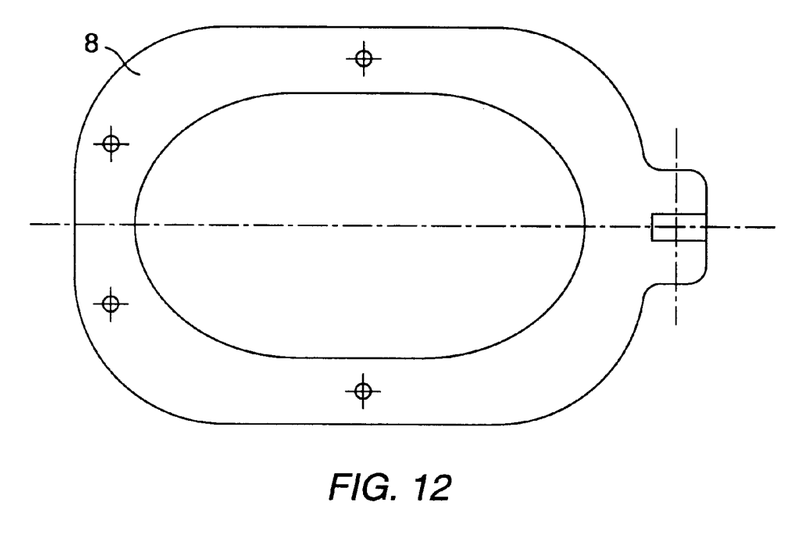
FIG. 12 is a top view of the seat ring in FIG. 11.
Figure 13:
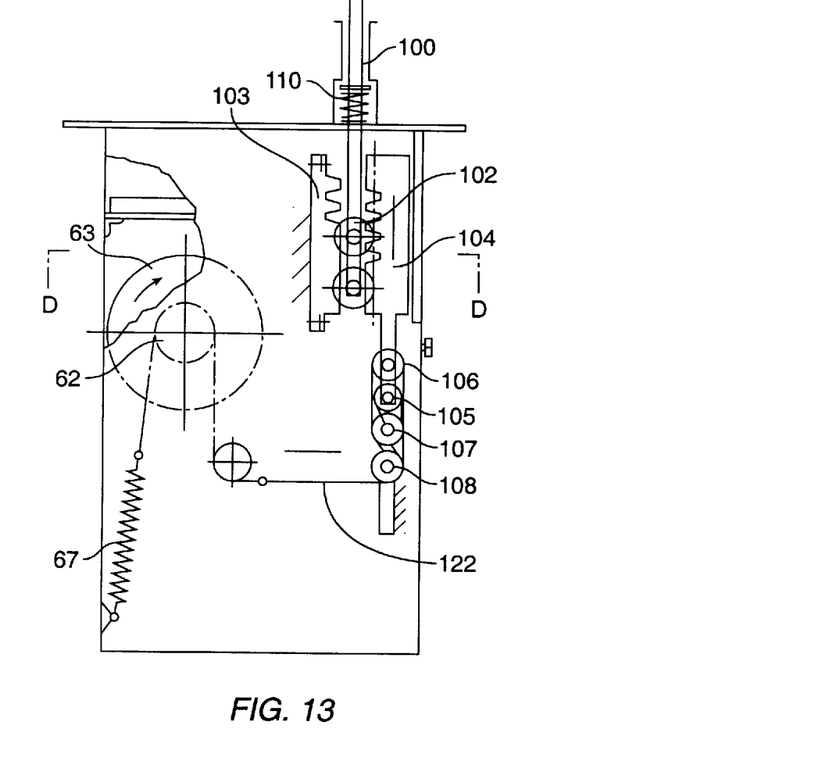
FIG. 13 is a view showing the transmission mechanism mounted in the case body of FIG. 12.
Figure 14:
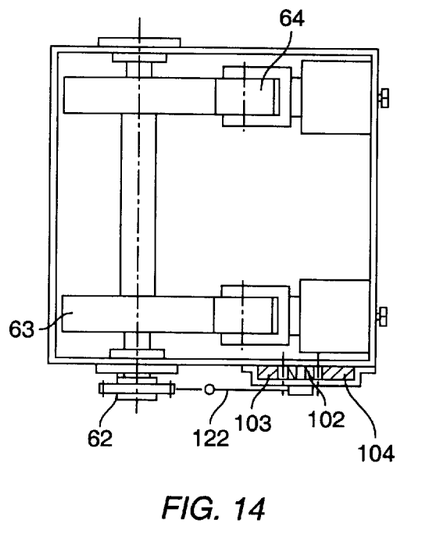
FIG. 14 is a sectional view cut along D—D line of FIG. 13.

FIGS. 6–7 show roller 70 in a closed state and said plastic bag 10 being clipped and sealed by two plywood boards 72. FIGS. 9–10 show roller 71 in an open state and plastic bag 10 going through a room shaped between said boards 72. Said pulling wheels 71 are used to pull said plastic bag 10.

FIGS. 11–16 show another embodiment of the present invention, which adopts an open-close pulling mechanism which is the same as that of FIGS. 1–10. The only difference is that the operation is initiated by seating pressure.

Referring to FIGS. 11–14 the toilet includes a case body 3, a shaped cavity 7 mounted on said case body, a seat ring 8 provided on said shaped cavity, a plastic bag cover (not shown) provided on the periphery of said case body, and an open-close pulling mechanism mounted in said case body 3. At least one open-close pulling performing mechanism is provided around the periphery of said plastic bag, which has a control rod 100 that may vertically glide. The seat ring 8 has its rear hinged with said shaped cavity 7. The control rod 100 has its upper end against said ring 8, which is effected by a spring 110 mounted on said rod 100. The lower part of said rod 100 is connected to a transmission mechanism 101, which includes at least one gear wheel 102 movably fixed on said rod 100. A fixed rack is joggled with said gear wheel 102 and gliding gear wheel 104. Provided on said rack 104 there is a pulling rope 122 connected to the open-close pulling mechanism, and said pulling rope 122 being connected to said open-close pulling mechanism by a pulley range expanding mechanism. Said pulley range expanding mechanism includes first and second movable pullies 107 and 108 and rope 122 which has one end fixed in said case body 3 and around the first movable pulley 105, the first fixed pulley 107, the second movable pulley 106 and second fixed pulley 108, and is then connected to said open-close pulling mechanism.

Figure 15:
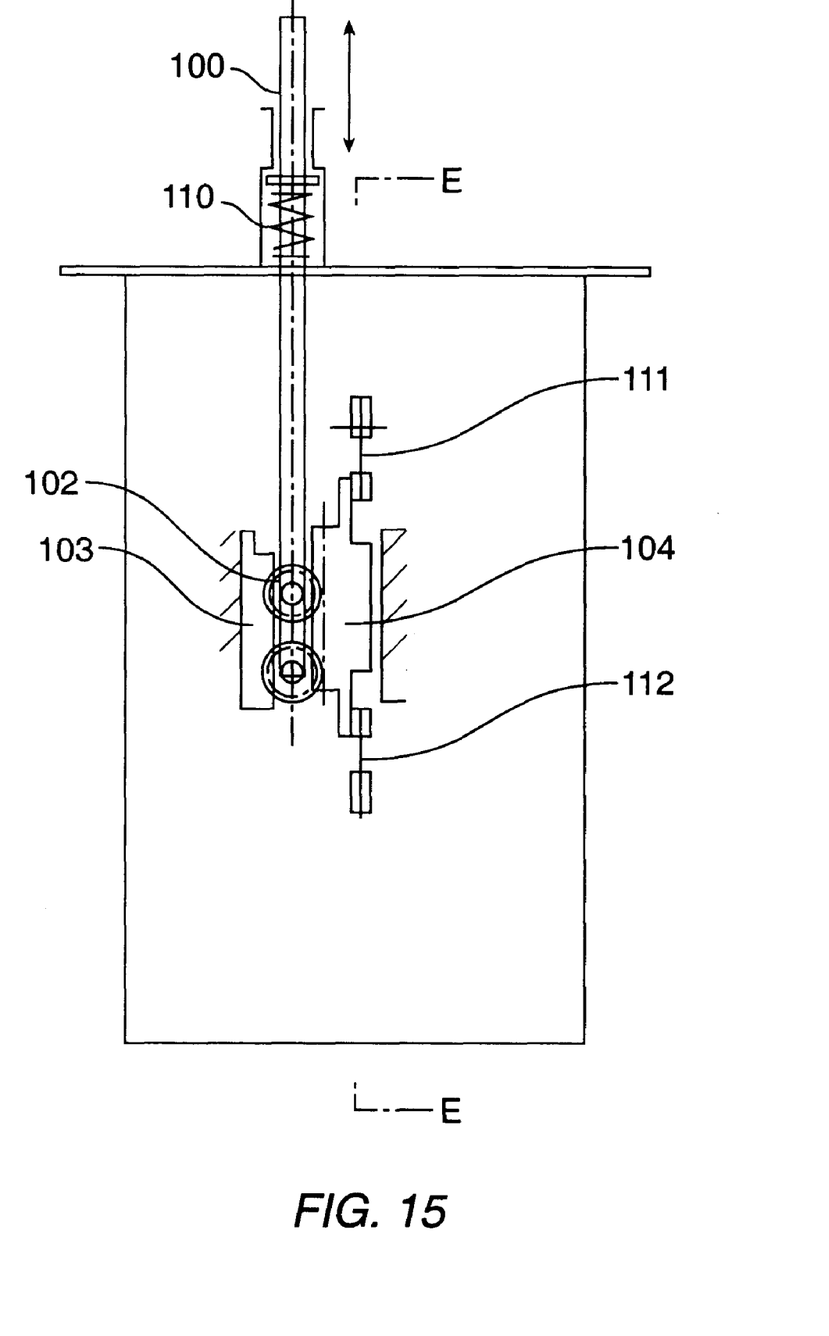
FIG. 15 is a view showing another transmission case body of FIG. 14.
Figure 16:
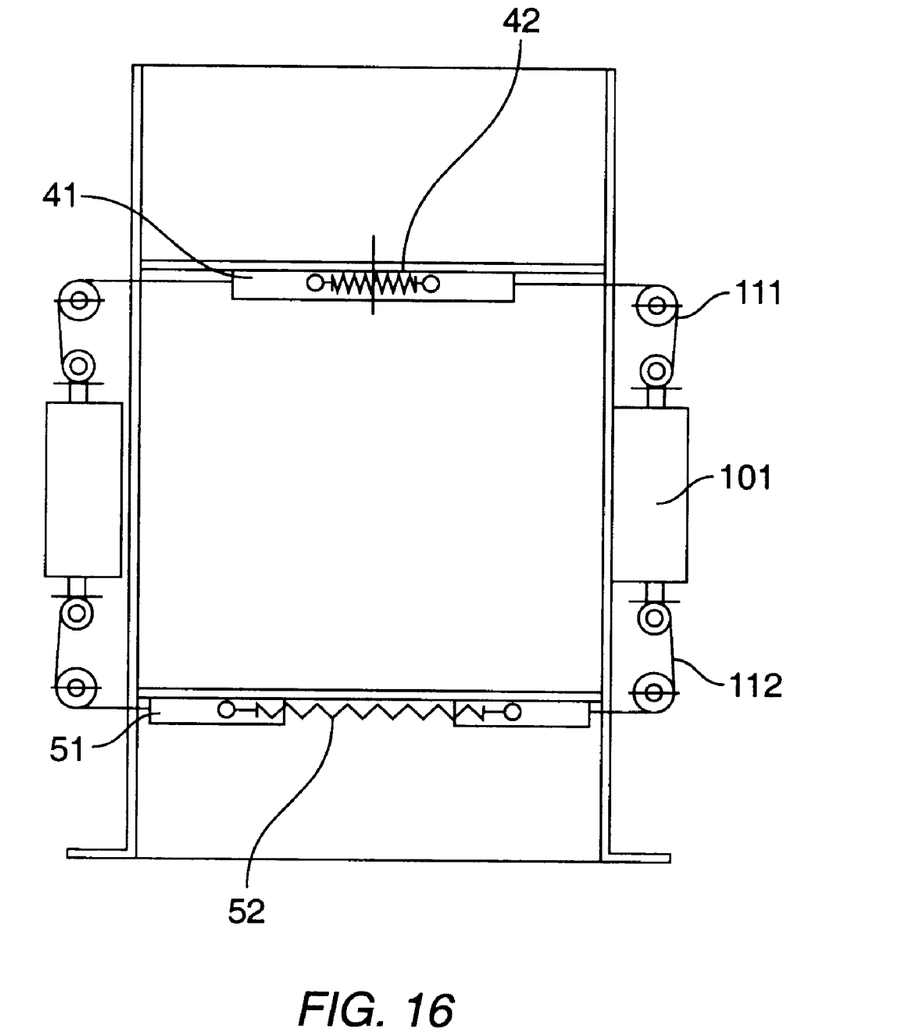
FIG. 16 is a view showing the sealing structure along E—E line of FIG. 15.

FIGS. 15–16 show another sealing structure including a pair of upper sealing doors 41 and a pair of lower sealing doors 51, as well as springs 42 and 52 which urge said sealing doors to close. On both sides of said case body there is symmetrically provided a pair of open-close mechanisms for sealing doors formed by fixed rack 103, movable rack 104, gear wheel 102 and control rod 100, wherein said upper and lower sealing doors are connected to the upper and lower ends of movable rack 104 by ropes 111 and 112, so as to pull said sealing door to open and close.

The next description of the process of operation is made by reference to FIGS. 1–5.

When one steps on pedal 2, no matter whether one sits on said seat ring 8 or not, pedal 2 will rotate around point 0. Crank 21 then overcomes the force of reset spring 12 to rotate in a counter clockwise direction. Rope 22 in turn, under the influence of spring 67, moves to the right of FIG. 2 so as to consequently make chain 62 rotate. Since there is a surpassing clutch provided between chain wheel 62 and pulling wheel 63, the pulling wheel does not move when chain wheel 62 freely rotates. At the same time, crank 23 rotates clockwise bringing rope 24 to move leftward, pulling open upper sealing door 41. Lower sealing door 51 closes by the action of spring 52. What is presented is a clean room for excrement. When one lifts pedal 2, reset spring 12 overcomes the force of spring 67 (the force of spring 12 is stronger than of spring 67) and pulls the plastic bag 10 containing excrement downward via pulling wheel 63 rotated by chain wheel 62, presenting shaped cavity 7 as a clean room while upper sealing door 41, activated by spring 42, overcomes the force of spring 52 and opens lower sealing door 51, making excrement fall into said excrement holding case, finishing one use of the toilet.

The embodiment of the present invention as described above may evidently be varied within the concept of the present invention, and all variations are within the capability of ordinary technicians. For example chain wheel 62 may be replaced by a belt wheel, the pulling roller may be a drum wheel as shown in PCT/CN96/00009 and an expanding ring as described in PCT/CN96/00009 may also be fixed within shaped cavity 7. Under the pulling wheel there may be provided a lower sealing door which opens or closes accordingly to its action. The lower sealing door may be a turning gate rotating around its axis.

I claim:

1. A fully automatic toilet usable without flushing which comprises a case body, a shaped cavity mounted on said case body, a seat ring provided on said shaped cavity, a cover for a plastic bag provided over a periphery of said case body and an opened-closed pulling mechanism mounted on said case body for controlling connection between said shaped cavity and an excrement holding case fixed under said case body, the toilet being further characterized in that said case body is fixed on a pedal being hinged at its rear to a base and its front end structured to swing, and there between being provided with a press spring, said pedal being at least hinged with a crank for controlling the operation of said opened-closed pulling mechanism, said crank having one end rolled in a supporting board of said base and the other end connected with said opened-closed pulling mechanism wherein said opened-closed pulling mechanism including a sealing means and a pulling means, said sealing means having a pair of upper sealing doors mounted on an upper partition board and a pair of lower sealing doors mounted on a lower partition board, said sealing doors having springs which urge them to close, said upper and lower sealing doors being characterized as being alternatively opened or closed and two upper doors connected with two pulling ropes through pulleys and two lower doors connected with said two upper doors through a pair of pulling ropes and pulleys, further characterized as having a spring employed in connection with said upper sealing doors which is stronger than a spring associated with said lower doors, said pulling means being provided between said upper and lower sealing doors and having a pulling wheel mounted on a transmission shaft and a tension wheel and a chain wheel mounted on said transmission shaft further comprising a surpassing clutch between said chain wheel and pulling wheel.

2. A toilet in accordance with claim 1 wherein said ropes are connected with said first crank and wherein pulling means are provided under said sealing doors having a pulling wheel mounted on said transmission shaft and further being provided with two cranks, a first crank for controlling said upper sealing doors and for controlling said pulling means.

3. A toilet in accordance with claim 1 or 2 characterized in that said first and second cranks have opposite directions of movement, said first crank having its swing end driving a chain wheel to rotate through use of a pulling rope and a chain connected with said rope, the chain having an end connected with said case body through an extension spring and between said swing end of said first crank and said base there being provided a reset spring, said reset spring being characterized as having a stronger force than that of said extension spring, said second crank being connected with a pair of ropes connected to said upper sealing doors and providing a surpassing clutch between said chain wheels and pulling wheels.

4. A toilet in accordance with claim 2 characterized in that said first crank and second crank have opposite directions of movement, said first crank having its swing end drive a chain wheel to rotate through a pulling rope and a chain connected with said rope, said chain having its other end connected with said case body through an extension spring, between said swing end of said first crank and said base there being connected a reset spring, said reset spring having a stronger force than that of the extension spring, said second crank being connected with a pair of ropes for connection to said upper sealing doors whereby a surpassing clutch is provided between said chain wheels and said pulling wheels.

5. The toilet of claim 1 characterized in that there is provided an expanding ring fixed within said shaped cavity.

6. The toilet in accordance with claim 2 characterized in that there is provided an expanding ring fixed within said shaped cavity.

* * * * *